United States Patent [19]

Kranig et al.

[11] Patent Number: 5,639,821
[45] Date of Patent: Jun. 17, 1997

[54] POWDER COATINGS

[75] Inventors: Wolfgang Kranig, Senden; Klaus Cibura, Münster; Joachim Woltering, Münster; Christopher Hilger, Münster; Josef Rademacher, Münster, all of Germany

[73] Assignee: BASF Lacke+Farben, AG, Muenster-Hiltrup, Germany

[21] Appl. No.: 379,521

[22] PCT Filed: Aug. 17, 1993

[86] PCT No.: PCT/EP93/02187

§ 371 Date: Mar. 28, 1995

§ 102(e) Date: Mar. 28, 1995

[87] PCT Pub. No.: WO94/04615

PCT Pub. Date: Mar. 3, 1994

[30] Foreign Application Priority Data

Aug. 26, 1992 [DE] Germany .......... 42 28 401.5

[51] Int. Cl.⁶ .......... C08L 37/00; C08L 63/00; C08L 67/00; C08L 73/02
[52] U.S. Cl. .......... 525/31; 525/167; 525/170; 525/176; 525/186; 525/190; 525/438; 525/449; 525/530; 525/533; 525/934
[58] Field of Search .......... 525/31, 170, 190, 525/176, 167, 186, 438, 449, 530, 533, 934

[56] References Cited

U.S. PATENT DOCUMENTS 3,508,951 4/1970 Shimp .......... 525/31
3,660,371 5/1972 Johnson et al.
4,891,403 1/1990 Farris .......... 525/26

FOREIGN PATENT DOCUMENTS 2030505  1/1969  France .......... C08F 11/00
3836370 10/1988  Germany .......... C08G 63/91
2055860  7/1980  United Kingdom .......... C08F 226/00

*Primary Examiner*—Patricia A. Short
*Attorney, Agent, or Firm*—Anne Gerry Sabourin

[57] ABSTRACT

The invention relates to powder coatings which are characterized in that they contain as film-forming material a mixture of (A) from 19.9 to 90.0 percent by weight of a synthetic resin which contains epoxide groups and may contain ethylenically unsaturated double bonds, or of a mixture of such epoxide group-containing synthetic resins, (B) from 9.9 to 80.0 percent by weight of a compound which contains carboxyl groups and may contain ethylenically unsaturated double bonds, or of a mixture of such carboxyl group-containing compounds, (C) from 0 to 20 percent by weight of a compound which contains ethylenically unsaturated double bonds and is different from (A) and (B), or of a mixture of such compounds, and (D) from 0.1 to 3.0 percent by weight of an initiator for free-radical polymerizations or of a mixture of initiators for free-radical polymerizations, the percentages by weight of (A)+(B)+(C)+(D) being=200% by weight and the mixture of components (A), (B), (C) and (D) containing from 0.1 to 6.0 mol of ethylenically unsaturated double bonds per 1000 g of mixture.

14 Claims, No Drawings

POWDER COATINGS

The invention relates to powder coatings which provide coating films having excellent properties, and in particular coating films of high flexibility with a high degree of hardness.

Powder coatings are known. Since they contain no solvents, they can be used for coating in an especially environment-friendly manner. The coating films which can be produced using powder coatings, however, remain in need of further improvement in terms of their properties.

The object on which the present invention is based consists in the provision of new powder coatings which can be used to produce coating films which, in relation to the prior art, have improved properties, and in particular a higher flexibility and a higher degree of hardness.

This object is achieved, surprisingly, by the provision of powder coatings which contain as film-forming material a mixture of (A) from 19.9 to 90.0 percent by weight of a synthetic resin which contains epoxide groups and may contain ethylenically unsaturated double bonds, or of a mixture of such epoxide group-containing synthetic resins, (B) from 9.9 to 80.0 percent by weight of a compound which contains carboxyl groups and may contain ethylenically unsaturated double bonds, or of a mixture of such carboxyl group-containing compounds, (C) from 0 to 20 percent by weight of a compound which contains ethylenically unsaturated double bonds and is different from (A) and (B), or of a mixture of such compounds, and (D) from 0.1 to 3.0 percent by weight of an initiator for free-radical polymerizations or of a mixture of initiators for free-radical polymerizations, the percentages by weight of (A)+(B)+(C)+(D) being=100% by weight and the mixture of components (A), (B), (C) and (D) containing from 0.1 to 6.0 mol of ethylenically unsaturated double bonds per 1000 g of mixture.

Using the powder coatings provided in accordance with the invention it has, surprisingly, been possible to produce coating films which, in relation to the prior art, have improved properties, and in particular higher flexibilities and higher degrees of hardness.

EP-A-38 635 describes powder coatings which contain, as film-forming material, a synthetic resin containing epoxide groups and a linear polyester containing carboxyl groups. Coating films prepared using these powder coatings possess, in comparison to coating films which have been produced using the powder coatings provided in accordance with the invention, poorer properties, and in particular poorer flexibilities and degrees of hardness.

The film-forming material of the powder coatings according to the invention comprises from 19.9 to 90.0 percent, preferably from 39.9 to 80.0 percent and particularly preferably from 49.9 to 70.0 percent by weight of component (A), from 9.9 to 80.0 percent, preferably from 19.9 to 60.0 percent and particularly preferably from 29.9 to 50.0 percent by weight of component (B), from 0 to 20 percent, preferably from 0.5 to 10.0 percent and particularly preferably from 1.0 to 5.0 percent by weight of component (C) and from 0.1 to 3.0 percent, preferably from 0.2 to 2.0 percent and particularly preferably from 0.5 to 1.5 percent by weight of component (D), the percentages by weight being based on (A)+(B)+(C)+(D)=100% by weight and the mixture of components (A), (B), (C) and (D) containing from 0.1 to 6.0 mol, preferably from 0.2 to 4.0 mol and particularly preferably from 0.3 to 2.5 mol of ethylenically unsaturated double bonds per 1000 g of mixture.

As component (A) it is possible in principle to employ any synthetic resin which contains epoxide groups and may contain ethylenically unsaturated double bonds, which can be employed for the production of powder coatings and has a melting point of from 20° to 100° C., preferably from 30° to 80° C. and particularly preferably from 30° to 60° C., or a mixture of such synthetic resins. Examples of epoxide group-containing synthetic resins which may be employed are epoxide group-containing polyacrylate resins, polyglycidyl ethers of aliphatic or cycloaliphatic alcohols such as ethylene glycol, diethylene glycol, 1,2-propylene glycol, 1,4-butylglycol, 1,2-cyclohexanediol, 1,4 cyclohexanediol, 1,2-bis(hydroxymethyl)cyclohexane and hydrogenated bisphenol A, or polyglycidyl ethers of polyphenols such as bisphenol A, 1,1-bis(4-hydroxyphenyl)ethane and 2-methyl-1,1-bis(4-hydroxyphenyl)propane, and the compounds containing epoxide groups which are listed in U.S. Pat. No. 4,102,942 in column 3, lines 1 to 16.

As component A) it is preferred to employ an epoxide group-containing polyacrylate resin or a mixture of epoxide group-containing polyacrylate resins.

The term epoxide group-containing polyacrylate resin refers to a polymer which can be prepared by copolymerization of at least one ethylenically unsaturated monomer, containing at least one epoxide group in the molecule, with at least one further ethylenically unsaturated monomer which contains no epoxide group in the molecule, at least one of the monomers being an ester of acrylic acid or methacrylic [sic] acid.

Epoxide group-containing polyacrylate resins are known (cf. e.g. EP-A-299 420, DE-B-22 14 650, U.S. Pat. No. 4,091,048 and U.S. Pat. No. 3,781,379).

Examples of ethylenically unsaturated monomers containing at least one epoxide group in the molecule are glycidyl acrylate, glycidyl methacrylate and allyl glycidyl ether.

Examples of ethylenically unsaturated monomers containing no epoxide group in the molecule are alkyl esters of acrylic and methacrylic acid which contain 1 to 20 carbon atoms in the alkyl radical, and in particular methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers containing no epoxide groups in the molecule are acids, for example acrylic acid and methacrylic acid, acid amides, for example acrylamide and methacrylamide, aromatic vinyl compounds such as styrene, α-methylstyrene and vinyltoluene, nitriles such as acrylonitrile and methacrylonitrile, vinyl halides and vinylidene halides, such as vinyl chloride and vinylidene fluoride, vinyl esters, for example vinyl acetate, and monomers containing hydroxyl groups, for example hydroxyethyl acrylate and hydroxyethyl methacrylate.

The epoxide group-containing polyacrylate resin usually has an epoxide equivalent weight of from 400 to 2500, preferably from 500 to 1500 and particularly preferably from 600 to 1200, a number-average molecular weight (determined by gel-permeation chromatism [sic] using a polystyrene standard) of from 1000 to 15,000, preferably from 1200 to 7000 and particularly preferably from 1500 to 5000, and a glass transition temperature ($T_G$) of from 30° to 80° C., preferably from 40° to 70° C. and particularly preferably from 40° to 60° C.

The epoxide group-containing polyacrylate resin can be prepared in accordance with generally well-known methods, by free-radical polymerization.

Components (A) containing ethylenically unsaturated double bonds can be prepared by using components which contain ethylenically unsaturated double bonds for the preparation of component (A), and/or by reacting functional groups, for example hydroxyl groups or epoxide groups, with compounds which contain ethylenically unsaturated double bonds (e.g. acrylic acid, methacrylic acid and unsaturated fatty acids). Preferred components (A) containing ethylenically unsaturated double bonds are prepared by reacting polyacrylate resins containing hydroxyl and/or epoxide groups with acrylic acid, methacrylic acid or with an unsaturated fatty acid.

The powder coatings according to the invention can in principle contain as component (B) any compound which contains carboxyl groups and may contain ethylenically unsaturated double bonds, which can be employed in powder coatings and has a melting point of from 20° to 100° C., preferably from 20° to 80° C. and particularly preferably from 20° to 60° C., or a mixture of such compounds. Examples of compounds containing carboxyl groups which can be employed are carboxyl group-containing polyester resins, polyanhydrides of polycarboxylic acids, and especially polyanhydrides of dicarboxylic acids. As component (B) it is preferred to employ a polyester resin containing carboxyl groups, a mixture of such polyester resins, a compound which contains on statistical average from 1.5 to 5.0 and preferably from 2 to 4 carboxyl groups and from 0 to 20 and preferably from 2 to 15 acid anhydride groups and from 0 to 10 and preferably from 0 to 5 ethylenically unsaturated double bonds per molecule, or a mixture of such compounds. As component (B) it is very particularly preferred to employ a mixture of from 95 to 5 percent, preferably from 95 to 20 percent and particularly preferably from 90 to 50 percent by weight of a carboxyl group-containing polyester resin and from 5 to 95 percent, preferably from 5 to 80 percent and particularly preferably from 10 to 50 percent by weight of a compound which contains on statistical average from 1.5 to 5 and preferably from 2 to 4 carboxyl groups and from 0 to 20 and preferably from 2 to 15 acid anhydride groups and from 0 to 10 and preferably from 0 to 5 ethylenically unsaturated double bonds per molecule, the sum of the proportions by weight in each case being 100 percent by weight.

The polyester resins containing carboxyl groups which can be employed as component (B) can be prepared by well-known methods, by reacting (b1) a diol which may be ethylenically unsaturated, or a mixture of such diols, (b2) optionally, a compound which may be ethylenically unsaturated and which contains per molecule at least three functional groups selected from hydroxyl, primary amino, secondary amino, carboxyl and acid anhydride groups, with one acid anhydride group being regarded as equivalent to two carboxyl groups, or a mixture of such compounds, and (b3) a dicarboxylic acid which may be ethylenically unsaturated, a dicarboxylic acid anhydride which may be ethylenically unsaturated, or a mixture of such dicarboxylic acids and/or dicarboxylic acid anhydrides; where either the carboxyl group-containing component is employed in excess or, in a first step, a polyester resin containing hydroxyl groups is prepared which is then further reacted with a carboxylic acid anhydride to give a polyester resin containing carboxyl groups. The carboxyl group-containing polyester resins employed as component (B) should have a number-average molecular weight (determined by gel-permeation chromatography using a polystyrene standard) of from 300 to 5000, preferably from 500 to 3000 and particularly preferably from 500 to 1700, a glass transition temperature of from 15° to 100° C., preferably from 20° to 80° C. and particularly preferably from 20° to 60° C., and an acid number of from 40 to 300 and preferably from 80 to 250. Carboxyl group-containing polyester resins which it is particularly preferred to employ are obtained by reacting components (b1), (b2) and (b3) in a molar ratio of (b1):(b2):(b3)=from 0.0 to 3.0:1.0:1.5 to 9.0, preferably from 0.0 to 2.0:1.0:2.0 to 8.0 and particularly preferably from 0.5 to 2.0:1.0:2.0 to 6.0.

The reaction of (b1), (b2) and (b3) is carried out by the well-known methods of polyester resin preparation. The reaction temperatures are usually from 140° to 240° C. and preferably from 160° to 200° C.

As component (b1) a diol which may be ethylenically unsaturated or a mixture of such diols is employed. The term diol refers to an organic compound which contains two hydroxyl groups per molecule. Examples of diols which can be employed are ethylene glycol, propylene glycol, neopentyl glycol, 1,6-hexanediol, cyclohexanediol, cyclohexanedimethanol, hydrogenated bisphenol A, and ethylene oxide or propylene oxide addition products with bisphenol A, hydrogenated bisphenol A and diethylene glycol.

As component (b1) it is preferred to employ aliphatic or cycloaliphatic diols having from 2 to 16 and preferably from 2 to 12 carbon atoms in the molecule, or mixtures of such diols.

The compound employed as component (b2) may be ethylenically unsaturated and contains per molecule at least three functional groups selected from hydroxyl, primary amino, secondary amino, carboxyl and acid anhydride groups, one acid anhydride group being regarded as equivalent to two carboxyl groups, or a mixture of such compounds.

Examples of compounds which can be employed as component (b2) are those containing per molecule at least three hydroxyl groups. Examples of such compounds are trimethylolpropane, pentaerythritol, trimethylolethane and glycerol.

As component (b2) it is also possible to employ compounds which contain two primary amino and one hydroxyl group per molecule. An example of such a compound is diaminopropanol.

Compounds which can be employed as component (b2) are also those containing per molecule at least three carboxyl groups or at least one acid anhydride group and one carboxyl group. Examples of such compounds are trimellitic acid, trimellitic anhydride, pyromellitic acid and pyromellitic anhydride.

As component (b3) a dicarboxylic acid which may be ethylenically unsaturated, a dicarboxylic acid anhydride which may be ethylenically unsaturated or a mixture of such dicarboxylic acids and/or dicarboxylic acid anhydrides is employed. Examples of dicarboxylic acids which can be employed are saturated and ethylenically unsaturated aliphatic or cycloaliphatic dicarboxylic acids, such as adipic acid, sebacic acid, azelaic acid, dodecanedioic acid, maleic acid, fumaric acid, succinic acid, hexahydrophthalic acid and tetrahydrophthalic acid. Examples of dicarboxylic acid anhydrides which can employed are the anhydrides of the stated acids.

As component (b3) it is also possible to employ aromatic dicarboxylic acids and their anhydrides, for example phthalic acid, isophthalic acid and terephthalic acid. The use of aromatic dicarboxylic acids and their anhydrides is less preferred.

As compounds which contain on statistical average from 1.5 to 5.0 and preferably from 2.0 to 4.0 carboxyl groups and from 0 to 20 and preferably from 2 to 15 acid anhydride groups and from 0 to 10 and preferably from 0 to 5 ethylenically unsaturated double bonds per molecule it is possible to employ polyanhydrides of saturated or ethylenically unsaturated polycarboxylic acids, in particular dicarboxylic acids, or polyanhydrides of mixtures of saturated or ethylenically unsaturated polycarboxylic acids, in particular dicarboxylic acids. Such polyanhydrides can be prepared by removing water from the polycarboxylic acid or mixture of polycarboxylic acids, each two carboxyl groups being converted to one anhydride group. Such preparation procedures are well known and therefore require no further discussion. It is also possible to employ polyanhydrides modified with a polyol, as described in EP-A-299 420, and this polyol modification can also be effected during the extrusion procedure.

Compounds of the type described above which it is preferred to employ are linear polyanhydrides of aliphatic or cycloaliphatic dicarboxylic acids having from 3 to 20 and preferably from 6 to 12 carbon atoms in the molecule, or linear polyanhydrides of mixtures of such dicarboxylic acids. Specific examples of polyanhydrides which it is preferred to employ are poly(adipic anhydride), poly(azelaic anhydride), poly(sebacic anhydride), poly(dodecanedioic anhydride) and poly(cyclohexanedicarboxylic anhydride).

As component (C) it is possible in principle to employ any compound which contains ethylenically unsaturated double bonds and can be employed in powder coatings, or a mixture of such compounds. Examples of compounds which can be employed as component (C) are: maleic anhydride, fumaric acid, acrylamide, methacrylamide, methacrylic acid, crotonic acid, methylenebisacrylamide, methylenebismethacrylamide, styrene, methyl methacrylate, methyl acrylate, butyl acrylate, divinylbenzene, hexanediol diacrylate, trimethylolpropane triacrylate and divinyldioxane. It is also possible to employ as component (C) polyurethane, polyester or polyacrylate resins which contain hydroxyl groups and are modified with acrylic or methacrylic acid. It is preferred to employ maleic anhydride as component (C).

As component (D) an initiator for free-radical polymerizations or a mixture of initiators for free-radical polymerizations is employed. Initiators for free-radical polymerization are compounds which, at elevated temperatures or under the effect of high-energy radiation, especially under the effect of UV radiation, decompose to give free radicals. These free radicals are able to initiate free-radical polymerizations. Examples of initiators which can be employed are azo compounds, for example azoisobutyronitrile, peroxides, for example dibenzoyl peroxide, dilauroyl peroxide and di-tert-butyl peroxide, and hydroperoxides, for example cumene hydroperoxide. As component (D) it is preferred to employ initiators which have a melting point of above 30° C. and a half-life at 120° C. of at least 5 and preferably at least 20 minutes.

It is essential to the invention for the mixture of components (A), (B), (C) and (D) to contain from 0.1 to 6.0 mol, preferably from 0.2 to 4.0 mol and particularly preferably from 0.3 to 2.5 mol of ethylenically unsaturated double bonds per 1000 g of mixture, with component (A) containing from 0 to 50 mole-percent, preferably from 0 to 10 mole-percent and particularly preferably from 0 to 5 mole-percent, component (B) containing from 0 to 100 mole-percent, preferably from 40 to 100 mole-percent and particularly preferably from 60 to 95 mole-percent and component (C) containing from 1 to 100 mole-percent, preferably from 1 to 60 mole-percent and particularly preferably from 5 to 40 mole-percent of the ethylenically unsaturated double bonds contained in the mixture.

The powder coatings according to the invention can also contain, in addition to the mixture of components (A), (B), (C) and (D) employed in accordance with the invention, other components conventional for powder coatings, for example crosslinking catalysts, pigments, UV stabilizers and leveling assistants.

The powder coatings according to the invention can be prepared by generally well-known methods. The preparation is in general carried out by extruding the mixture of components (A), (B), (C), (D), optionally together with further conventional additives, and milling the extrudate obtained. It is also possible to add component (D) after the extrusion of components (A), (B) and (C) and to mill the components (A), (B), (C) and (D) in unison.

The powder coatings according to the invention can be used both without pigments (i.e. as clearcoats) and with pigments for the coating of any desired substrates, for example metal, wood, glass or plastic.

The powder coatings according to the invention can also be used to coat car bodies. They can be employed in particular, possibly as clearcoats, in two-coat finishes of the basecoat/clearcoat type.

The powder coatings according to the invention can be applied using the application techniques which are customary for powder coatings. The coating films produced using the powder coatings according to the invention are stoved at from 120° to 220° C., preferably from 140° to 200° C. and particularly preferably from 140° to 180° C. The stoving time is from 5 to 60 and preferably from 5 to 30 minutes. When an initiator is employed, as component (D), which can be activated with the aid of high-energy radiation, preferably UV radiation, the coating film must additionally also be irradiated with the corresponding radiation. The irradiation is carried out preferably after the storing procedure.

The invention is illustrated in more detail in the examples below. All parts and percentages are by weight, unless expressly stated otherwise.

1. Preparation of Component (A)

Over a period of 4 hours a mixture of 37.06 parts by weight of methyl methacrylate, 14.40 parts by weight of glycidyl methacrylate, 9.00 parts by weight of n-butyl acrylate and 6.54 parts by weight of styrene is added at 120° C. to 30.0 parts by weight of xylene. Commencing with the addition of the monomer mixture, 3.0 parts of tert-butyl per-2-ethylhexanoate (TBPEH; manufacturer: Peroxid Chemie) are added over a period of 4.5 hours. During the addition of the monomer mixture and the peroxide the reaction temperature is 140° C. This temperature is maintained after completing the addition of the peroxide for a further hour. The xylene is then removed under reduced pressure, and the synthetic resin is heated to 180° C. and drained off from the reaction vessel. The resulting polyacrylate resin has an epoxide equivalent weight of 686 g/mol.

2. Preparation of Component (B)

2.1 A mixture of 447 parts by weight of hexane-1,6-diol, 338 parts by weight of trimethylolpropane, 792 parts by weight of hexahydrophthalic anhydride and 504 parts by weight of maleic anhydride is slowly heated, and the water formed is removed from the reaction mixture with the aid of a water separator. As soon as the reaction product has reached an acid number of 160, the batch is cooled and at 100° C. is drained off from the reaction vessel. The resulting polyester resin, which contains double bonds and carboxyl groups and can be polymerized by a free-radical mechanism, has a glass transition temperature ($T_G$) of 20° C.

2.2 A mixture of 722 parts by weight of hexane-1,6-diol, 307 parts by weight of trimethylolpropane and 1240 parts by weight of fumaric acid is slowly heated and the water which forms is removed from the reaction mixture with the aid of a water separator. As soon as the reaction product has reached an acid number of 160, the batch is cooled and at 100° is drained off from the reaction vessel. The resulting polyester resin, which contains double bonds and carboxyl groups and can be polymerized by a free-radical mechanism, has a glass transition temperature ($T_G$) of 22° C.

2.3 67.2 parts by weight of dodecanedioic acid are weighed out together with 29.8 parts by weight of acetic anhydride and charged to a reaction vessel having a reflux condenser. The mixture is slowly heated until reflux sets in and is left for 3 hours under reflux. The acetic acid which has formed is then removed by distillation. Subsequently a further 3.00 parts by weight of acetic anhydride are added to the reaction product, and the mixture is heated for one hour at reflux temperature. Finally, the acetic acid which has formed is removed by distillation and the reaction product is drained off at 90° C. from the reaction vessel.

3. Preparation of Powder Coatings According to the Invention 3.1 800 parts by weight of component (A) prepared as in section 1. are comminuted in a precutting mill together with 280 parts by weight of component (B) prepared as in section 2.1, 31 parts by weight of component (B) prepared as in section 2.3, 19 parts by weight of maleic anhydride, 5 parts by weight of monobutyltin oxide, 6 parts by weight of a leveling assistant based on polyacrylate resin (Perenol® F 40, manufacturer: Henkel KgaA), 10 parts by weight of benzoin, 26 parts by weight of a first light stabilizer (Tinuvin® 900, manufacturer: Ciba Geigy AG) and 16 parts by weight of a second light stabilizer (Tinuvin® 144, manufacturer: Ciba Geigy AG) and subsequently premixed. The resulting mixture is then extruded in a co-kneader from Buss (type PLK 46), the temperature in the center of the extrusion chamber being from 90°–100° C. The extrudate is cooled rapidly to room temperature and comminuted using a precutting mill. It is then admixed with 5.9 parts by weight of dicumyl peroxide (Perkadox BC, manufacturer: Akzo), the resulting mixture is ground in an impact mill (ACM 2L from Hosokawa MikroPul) to give a powder having an average particle diameter of from 30–40 µm, and is screened through a sieve having a pore size of 125 µm.

3.2 800 parts by weight of component (A) prepared as in section 1. are comminuted in a precutting mill together with 280 parts by weight of component (B) prepared as in section 2.1, 31 parts by weight of component (B) prepared as in section 2.3, 19 parts by weight of maleic anhydride, 5 parts by weight of monobutyltin oxide, 6 parts by weight of a leveling assistant based on polyacrylate resin (Perenol® F 40, manufacturer: Henkel KgaA), 10 parts by weight of benzoin and 353 parts by weight of titanium dioxide, and subsequently premixed. The resulting mixture is then extruded in a co-kneader from Buss (type PLK 46), the temperature in the center of the extrusion chamber being from 90°–100° C. The extrudate is cooled rapidly to room temperature and comminuted using a precutting mill (particle diameter from 1 to 3 mm). It is then admixed with 7.6 parts by weight of dicumyl peroxide (Perkadox BC, manufacturer: Akzo), the resulting mixture is ground in an impact mill (ACM 2L from Hosokawa MikroPul) to give a powder having an average particle diameter of from 30–40 µm, and is screened through a sieve having a pore size of 125 µm.

3.3 800 parts by weight of component (A) prepared as in section 1. are comminuted in a precutting mill together with 295 parts by weight of component (B) prepared as in section 2.2, 31 parts by weight of component (B) prepared as in section 2.3, 19 parts by weight of maleic anhydride, 5 parts by weight of monobutyltin oxide, 6 parts by weight of a leveling assistant based on polyacrylate resin (Perenol® F 40, manufacturer: Henkel KgaA), 10 parts by weight of benzoin and 358 parts by weight of titanium dioxide, and subsequently premixed. The resulting mixture is then extruded in a co-kneader from Buss (type PLK 46), the temperature in the center of the extrusion chamber being from 90°–100° C. The extrudate is cooled rapidly to room temperature and comminuted using a precutting mill (particle diameter from 1 to 3 mm). It is then admixed with 7.6 parts by weight of dicumyl peroxide (Perkadox BC, manufacturer: Akzo), the resulting mixture is ground in an impact mill (ACM 2L from Hosokawa MikroPul) to give a powder having an average particle diameter of from 30–40 µm, and is screened through a sieve having a pore size of 125 µm.

4. Application of the Powder Coatings According to the Invention

The powder coatings prepared as in sections 3.1, 3.2 and 3.3 are applied electrostatically to degreased steel panels. After the application the panels are stoved for 30 minutes at 180° C. The stoved coating films have a film thickness of from 40 to 60 µm. They are notable in particular for their high flexibility (T-bend: 2 mm) with a high degree of hardness (pencil hardness: 3H–5H, Buchholz hardness 100–125).

We claim:

1. A powder coating including a film-forming material consisting essentially of:
   (A) from 19.9 to 90.0 percent by weight of a synthetic resin which contains epoxide groups and which may optionally contain ethylenically unsaturated double bonds, or of a mixture of such epoxide group-containing synthetic resins;
   (B) from 9.9 to 80.0 percent by weight of a compound which contains carboxyl groups and which may optionally contain ethylenically unsaturated double bonds, or of a mixture of such carboxyl group-containing compounds;
   (C) from 0 to 20 percent by weight of a compound which contains ethylenically unsaturated double bonds, or of a mixture of such compounds; and
   (D) from 0.1 to 3.0 percent by weight of an initiator for free-radical polymerizations, or of a mixture of initiators for free-radical polymerizations;
wherein the sum of the percentages by weight of (A)+(B)+(C)+(D) is 100% by weight, and further wherein the mixture of components (A), (B), (C), and (D) contains from 0.1 to 6.0 mol of ethylenically unsaturated double bonds total per 1000 g of mixture.

2. A powder coating according to claim 1, wherein the film-forming material employed is a mixture of from 39.9 to 80.0 percent by weight of component (A), from 19.9 to 60.0 percent by weight of component (B), from 0.5 to 10.0 percent by weight of component (C), and from 0.2 to 2.0 percent by weight of component (D).

3. A powder coating according to claim 1, wherein component (A) is selected from the group consisting of polyacrylate resins containing epoxide groups and mixtures thereof.

4. A powder coating according to claim 1, wherein component (B) is selected from the group consisting of polyester resins containing carboxyl groups and mixtures thereof.

5. A powder coating according to claim 1, wherein the polyester resin employed as component (B) is obtained by reacting (b1) a diol which may optionally be ethylenically unsaturated, or a mixture of such diols, (b2) a compound which may optionally be ethylenically unsaturated and which contains per molecule at least three functional groups selected from the group consisting of hydroxyl, primary amino, secondary amino, carboxyl, and acid anhydride groups, and mixtures thereof, with one acid anhydride group being regarded as equivalent to two carboxyl groups, and (b3) a dicarboxylic acid which may optionally be ethylenically unsaturated, a dicarboxylic acid anhydride which may optionally be ethylenically unsaturated, or mixtures thereof, wherein the molar ratio of (b1):(b2):(b3) is from 0.0 to 3.0:1.0:1.5 to 9.0, to give a polyester resin having an acid value of from 40 to 300, or a mixture of such polyester resins.

6. A powder coating according to claim 1, wherein the compound used as component (B) contains on statistical average from 1.5 to 5.0 carboxyl groups and from 0 to 20 acid anhydride groups and from 0 to 10 ethylenically unsaturated double bonds per molecule, or a mixture of such compounds.

7. A powder coating according to claim 5, wherein component (B) comprises a mixture of from 95 to 5 percent by weight of the polyester resin and from 5 to 95 percent by weight of a second compound containing on statistical average from 1.5 to 5.0 carboxyl groups and from 0 to 20 acid anhydride groups and from 0 to 10 ethylenically unsaturated double bonds per molecule, or a mixture of such compounds; the sum of the proportions by weight of the polyester resin and of the second compound always being 100% by weight.

8. A powder coating according to one of claims 1, 6, or 7, wherein maleic anhydride is employed as component (C).

9. A powder coating according to one of claims 1, 6, or 7, wherein component (D) has a half-life at 120° C. of at least 5 minutes.

10. A powder coating according to one of claims 1, 6, or 7, wherein the mixture of components (A), (B), (C), and (D) contains from 0.2 to 4.0 mol of ethylenically unsaturated double bonds per 1000 g of mixture.

11. A powder coating according to claim 1, wherein the film-forming material employed is a mixture of from 49.9 to 70.0 percent by weight of component (A), from 29.9 to 50.0 percent by weight of component (B), from 1.0 to 5.0 percent by weight of component (C), and from 0.5 to 1.5 percent by weight of component (D).

12. A powder coating according to claim 1, wherein the polyester resin employed as component (B) is obtained by reacting (b1) a diol which may optionally be ethylenically unsaturated, or a mixture of such diols, (b2) a compound which may optionally be ethylenically unsaturated and which contains per molecule at least three functional groups selected from the group consisting of hydroxyl, primary amino, secondary amino, carboxyl and acid anhydride groups, and mixtures thereof, with one acid anhydride group being regarded as equivalent to two carboxyl groups, and (b3) a dicarboxylic acid which may optionally be ethylenically unsaturated, a dicarboxylic acid anhydride which may optionally be ethylenically unsaturated, or mixtures thereof, wherein the molar ratio of (b1):(b2):(b3) is from 0.5 to 2.0:1.0:2.0 to 6.0, to give a polyester resin having an acid value of from 80 to 250, or a mixture of such polyester resins.

13. A powder coating including a film-forming material consisting essentially of:

(A) from 19.9 to 90.0 percent by weight of a compound selected from the group consisting of polyacrylate resins containing epoxide groups and mixtures thereof;

(B) from 9.9 to 80.0 percent by weight of a compound selected from the group consisting of polyester resins containing carboxyl groups and mixtures thereof;

(C) from 0 to 20 percent by weight of maleic anhydride; and (D) from 0.1 to 3.0 percent by weight of an initiator for free-radical polymerizations, or of a mixture of initiators for free-radical polymerizations having a half-life at 120° C. of at least 5 minutes;

wherein the sum of the percentages by weight of (A)+(B)+(C)+(D) is=100% by weight, and further wherein the mixture of components (A), (B), (C), and (D) contains from 0.1 to 6.0 mol of ethylenically unsaturated double bonds total per 1000 g of mixture.

14. A powder coating according to claim 13, wherein the polyester resin employed as component (B) is obtained by reacting (b1) a diol which may optionally be ethylenically unsaturated, or a mixture of such diols, (b2) a compound which may optionally be ethylenically unsaturated and which contains per molecule at least three functional groups selected from the group consisting of hydroxyl, primary amino, secondary amino, carboxyl, and acid anhydride groups, and mixtures thereof, with one acid anhydride group being regarded as equivalent to two carboxyl groups, and (b3) a dicarboxylic acid which may optionally be ethylenically unsaturated, a dicarboxylic acid anhydride which may optionally be ethylenically unsaturated, or mixtures thereof.

wherein the molar ratio of (b1):(b2):(b3) is from 0.5 to 2.0:1.0:2.0 to 6.0, to give a polyester resin having an acid value of from 80 to 250, or a mixture of such polyester resins.

* * * * *